United States Patent
Inbar et al.

(10) Patent No.: US 12,314,132 B2
(45) Date of Patent: May 27, 2025

(54) ZNS PROTECTION WITH SMALL SLC CACHE USING ZONE GROUPS

(71) Applicant: Western Digital Technologies, Inc., San Jose, CA (US)

(72) Inventors: Karin Inbar, Ramat Hasharon (IL); Stephen Gold, Fort Collins, CO (US); Liam Parker, Edinburgh (GB)

(73) Assignee: Sandisk Technologies, Inc., Milpitas, CA (US)

( * ) Notice: Subject to any disclaimer, the term of this patent is extended or adjusted under 35 U.S.C. 154(b) by 147 days.

(21) Appl. No.: 18/354,446

(22) Filed: Jul. 18, 2023

(65) Prior Publication Data

US 2024/0220359 A1 Jul. 4, 2024

Related U.S. Application Data

(60) Provisional application No. 63/478,280, filed on Jan. 3, 2023.

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01)

(58) Field of Classification Search
CPC ............................ G06F 11/1068; G06F 11/076
See application file for complete search history.

(56) References Cited

U.S. PATENT DOCUMENTS

| | | | |
|---|---|---|---|
| 10,956,324 B1* | 3/2021 | Giles | G06F 9/526 |
| 11,568,938 B2* | 1/2023 | Gorobets | G11C 16/26 |
| 11,586,385 B1* | 2/2023 | Lercari | G06F 1/30 |
| 2016/0147454 A1 | 5/2016 | Meir et al. | |
| 2016/0179371 A1 | 6/2016 | Sinclair | |
| 2016/0378379 A1 | 12/2016 | Sinclair et al. | |
| 2017/0315891 A1* | 11/2017 | Park | G11C 29/88 |
| 2020/0117538 A1* | 4/2020 | Singidi | G06F 12/0246 |
| 2021/0182166 A1 | 6/2021 | Hahn et al. | |
| 2021/0263674 A1* | 8/2021 | Shin | G06F 3/061 |
| 2021/0326250 A1* | 10/2021 | Bennett | G06F 3/0679 |
| 2021/0334161 A1* | 10/2021 | Helmick | G06F 3/0644 |
| 2022/0075545 A1* | 3/2022 | Agarwal | G06F 11/1004 |
| 2022/0278697 A1 | 9/2022 | Vishne et al. | |
| 2022/0391115 A1* | 12/2022 | Muthiah | G06F 12/0607 |
| 2024/0354191 A1* | 10/2024 | Miller | G06F 11/1048 |

* cited by examiner

*Primary Examiner* — Guy J Lamarre
(74) *Attorney, Agent, or Firm* — PATTERSON + SHERIDAN, LLP

(57) ABSTRACT

The present disclosure generally relates to achieving an acceptable uncorrectable bit error rate (UBER) using a dual temporary data protecting approach and a small SLC cache by adding a temporary XOR protection to zone-groups rather than storing another copy of the zone within the drive. The parity data can be stored with the user data (e.g., as part of the zone-group, effectively increasing zone-group size by 1) or in a separate location, e.g., in an SLC block or another separate MLC block.

20 Claims, 4 Drawing Sheets

ZNS PROTECTION WITH SMALL SLC CACHE USING ZONE GROUPS

CROSS-REFERENCE TO RELATED APPLICATIONS

This application claims benefit of U.S. Provisional Patent Application Ser. No. 63/478,280, filed Jan. 3, 2023, which is herein incorporated by reference.

BACKGROUND OF THE DISCLOSURE

Field of the Disclosure

Embodiments of the present disclosure generally relate to writing in a zone namespace (ZNS) environment.

Description of the Related Art

Zoned Namespace (ZNS) solid-state drive (SSD) architectures expect the host application(s) to always perform sequential writes, and deallocate data at the boundaries of the drive's block size, and thus removing the need of garbage collection (GC) operations in the drive and also removing the need of over-provisioning to support GC. As such, ZNS provides better utilization of the drive's space as well as higher endurance.

ZNS zone groups combine multiple small zones that are allocated together that will be accessed together when writing and potentially also reading data into or from the zone group. Zone groups are meant to be used for performance acceleration, by allowing the system to write to multiple plane-blocks in parallel, and even multiple dies. When using zone groups, the host commits to perfect interleaving of write operations of different zones within the same zone-group.

With "small zone" ZNS SSDs, the zones can be as small as a single memory device (e.g., NAND) erase block on a single plane. With a small zone ZNS SSD, there is no way to maintain permanent XOR parity protection across multiple planes/dies, as each zone spans a limited number of planes, or even simply a single plane, and the lifetime of different zones is different. Therefore, small zone ZNS SSDs normally have no permanent XOR parity protection stored in the memory device for recovering defects or high BER that may show up after the zone is written. Given the expectation, uncorrectable bit error rate (UBER) requirements are typically lowered to 1 uncorrectable error correction code (UECC) in 1014 sectors as compared to a typical 1 UECC in 1017.

However, even with the lowered UBER requirements, without full zone (a.k.a. block) protection, the incoming host write data is vulnerable to defects that can result in an inability to achieve the required 1 UECC in 1014. Therefore, typical implementations choose to store another copy of the zone data in the drive (e.g., by writing zones to a single cell (SLC) or elsewhere) a multilevel cell (MLC) such as a triple level cell (TLC) or quad level cell (QLC), and there is no failure detected during zone programming phase. This other copy might be written as a first stage and then data is copied to MLC, or potentially the other copy might be written in parallel to writing the data to MLC. This other copy can be used to recover the entire zone data in case of a failure.

There are various types of failures that can show up in an SSD. Some failures are limited to a small amount of the latest written data, and some failures may end up losing big portions of the erase-block being written, potentially the entire data. In some systems, in order to meet the 1e-14 UBER requirements, there is a need to support data recovery of the entire zone (or big portion of the zone) during the MLC programming phase until the data is written successfully, so the "other copy" of the zone should be allocated for the entire zone programming phase.

A "small zone" ZNS SSD might support many open small zones that might be written in parallel, e.g., 16K open zones per 64 TB drive. In parallel, a single erase-block size might be big, e.g. 200 MB. Therefore, storing another copy in SSD of all the open zones results with losing a significant portion of the drive capacity, hence increasing SSD cost significantly.

Therefore, there is a need in the art to achieve the required UBER, with a different scheme.

SUMMARY OF THE DISCLOSURE

The present disclosure generally relates to achieving an acceptable uncorrectable bit error rate (UBER) using a dual temporary data protecting approach and a small SLC cache by adding a temporary XOR protection to zone-groups rather than storing another copy of the zone within the drive. The parity data can be stored with the user data (e.g., as part of the zone-group, effectively increasing zone-group size by 1) or in a separate location, e.g., in an SLC block or another separate MLC block.

In one embodiment, the protection scheme of "independent zones" still uses the legacy method, by storing another copy of the zone data for the zone programming phase. When the host opens a new zone, the host determines whether the zone should be allocated as part of a zone-group or as an "independent zone". The controller should declare during initialization how many open-zones are supported while being opened as part of "zone group" and how many open-zones are supported while being opened as "independent zones". The controller also declares the size of a zone-group. The number of "independent zones" is expected to be significantly smaller than the total number of open zones. For example, if the number of "independent zones" is 25% out of all open zones, and the zone-group size is 16, then the total space required for protection of all zones becomes <30% in comparison to the required space if protection all zones by keeping "another copy" of the data. This allows significant cost saving to the SSD drive.

In another embodiment, a data storage device comprises: a memory device; and a controller coupled to the memory device, wherein the controller is configured to: receive a write command for one or more zones in a zoned namespace (ZNS) environment of the memory device; determine whether write command is to write data to an independent zone or to a zone of a zone group; generate parity data for user data corresponding to the write command if it's a zone of a zone-group; and store the parity data.

In another embodiment, a data storage device with a small SLC cache and a dual temporary data protecting approach comprises: a memory device; and a controller coupled to the memory device, wherein the controller is configured to store temporarily the exclusive or (XOR) parity data of a plurality of open zone groups in the memory and to store another temporary copy of independent zones user data without a XOR parity in a small SLC cache or in MLC.

In another embodiment, a data storage device comprises: a memory device; and a controller coupled to the memory device, wherein the controller is configured to: open either an independent zone or a zone within a zone group based upon a command received from a host device; and write to either the independent zone or the zone within the zone group.

In another embodiment, a data storage device comprises: means to store data; and a controller coupled to the means to store data, wherein the controller is configured to: allocate a first predetermined amount of the means to store data for independent zones; and allocate a second predetermined amount of the means to store data for zone groups, wherein the second predetermined amount is greater than the first predetermined amount.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to achieving an acceptable uncorrectable bit error rate (UBER) using a dual temporary data protecting approach and a small SLC cache by adding a temporary XOR protection to zone-groups rather than storing another copy of the zone within the drive. The parity data can be stored with the user data (e.g., as part of the zone-group, effectively increasing zone-group size by 1) or in a separate location, e.g., in an SLC block or another separate MLC block.

Figure 1:
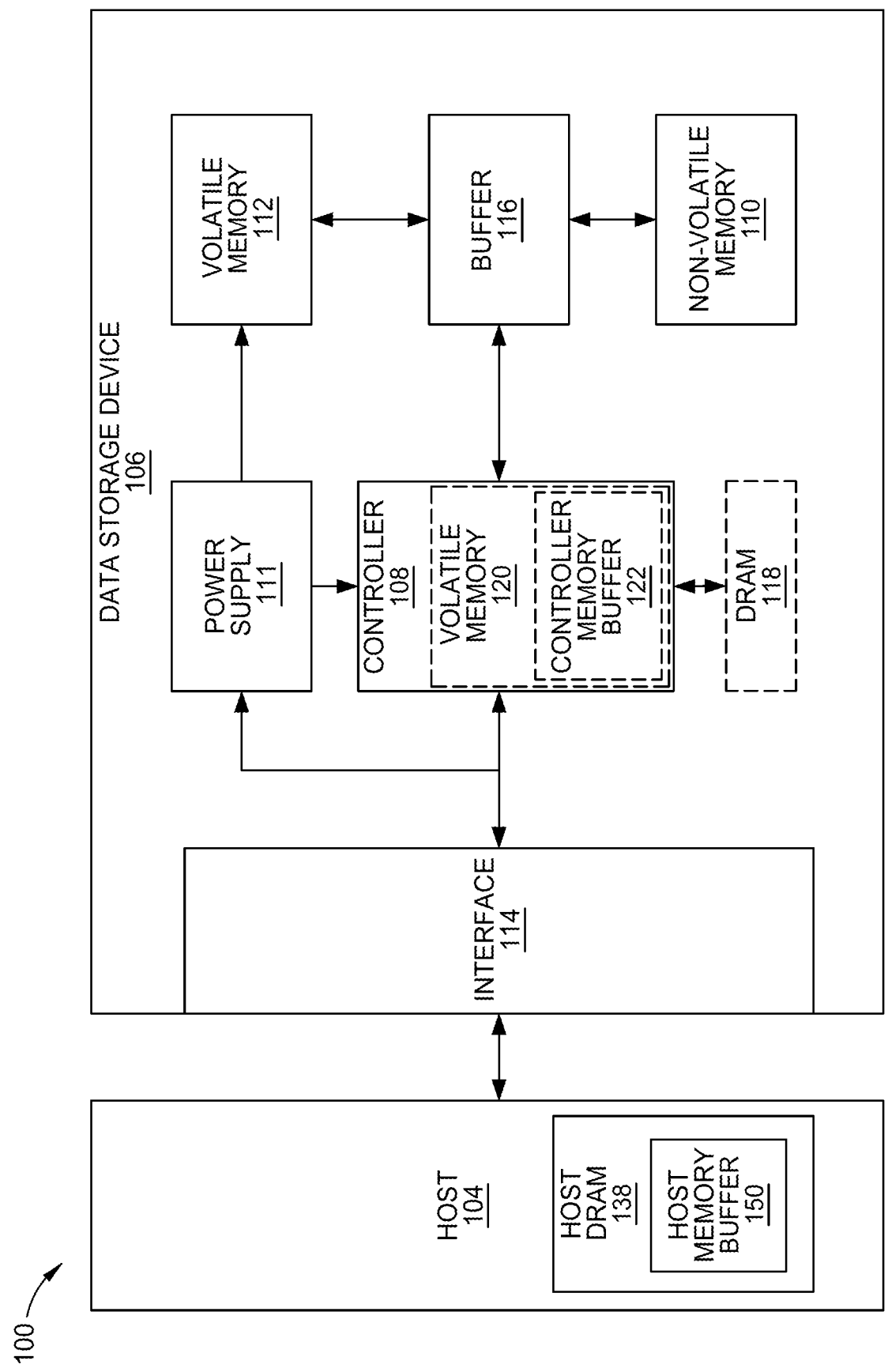
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fiber Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As discussed herein, ZNS utilizes zones in the memory device for storing data. Traditional zone are quite large and may be referred to as individual zones or independent zones. A trend in industry is emerging wherein smaller zones are utilized, where the small zones can be grouped together to collectively reach the size of a traditional or independent zone. Such small zones grouped together are referred to as a zone group. An example of a small zone of a zone group is one plane in one die of the memory device whereas an independent or individual zone may include multiple dies. Hence, a zone group may span multiple dies.

One manner to deal with a lack of protection for zones is to stage all incoming host write zone data in SLC. The data would then be copied to QLC after the entire zone is written. In so doing, data can be recovered from SLC in case of a hitting a block failure when programming the data in QLC. The approach is valid for zone groups as well where the individual small zones of the zone group are written to SLC and then copied to QLC only after the entire zone group has been written to SLC. In either situation, once the data is in QLC, and valid, the SLC can be released and/or erased.

Figure 2:
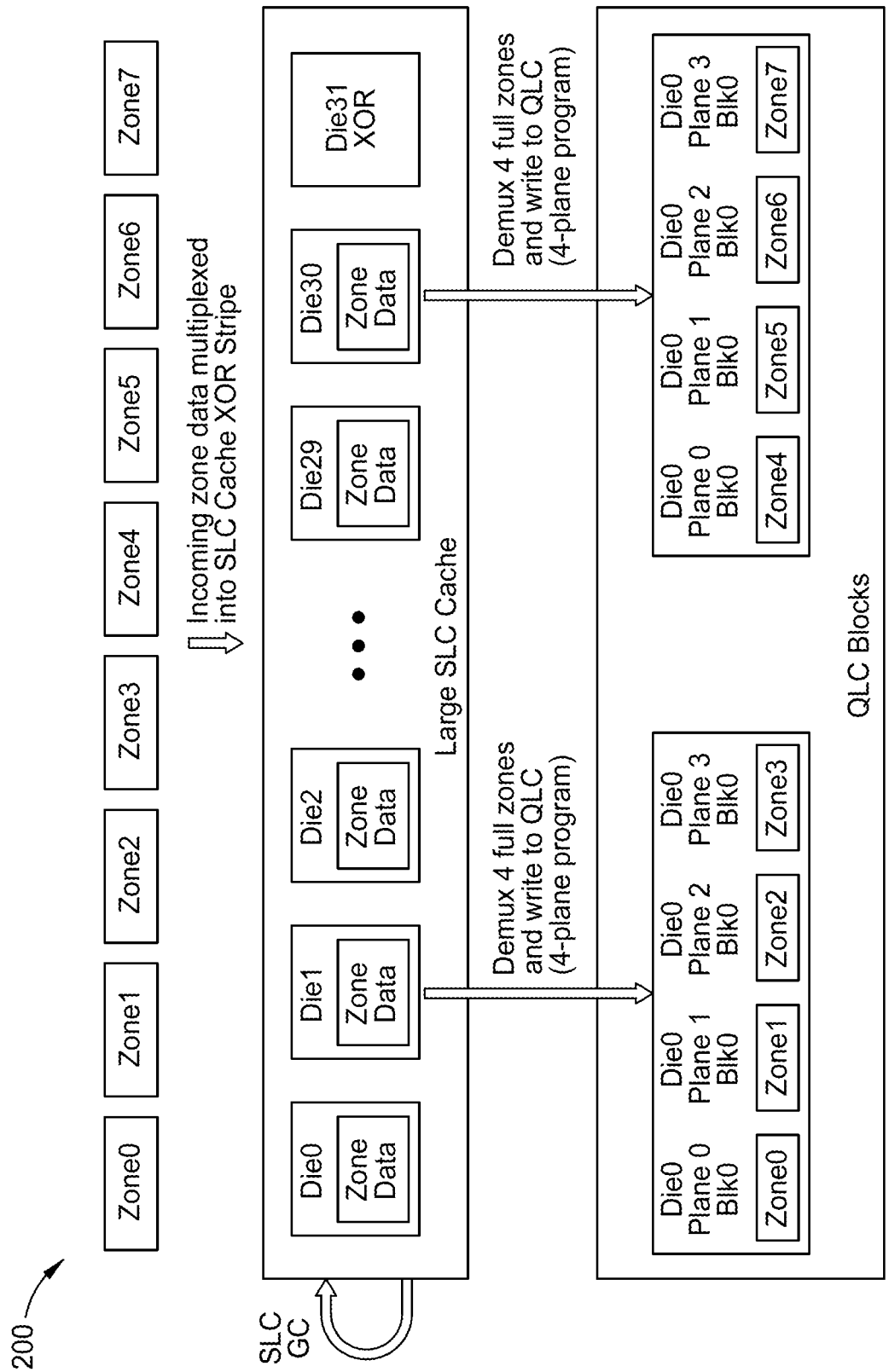
FIG. 2 is a schematic illustration of writing to zones in a ZNS environment according to one embodiment.

FIG. 2 is a schematic illustration 200 of writing to zones in a ZNS environment according to one embodiment. As shown in FIG. 2, incoming zone data, be it small zones or an individual zone, is multiplexed into SLC cache. Once all of the data is in SLC cache, the data is demuxed and written to QLC. The demuxing occurs 4 full zones at a time due to the QLC 4 plane programming. The data in QLC may, optionally, be validated. Regardless, after writing all of the data to QLC or after validation, the SLC cache is no longer needed for the data, and garbage collection of the SLC cache may occur.

It is contemplated that the data can be written to SLC and then copied to QLC. Alternatively, it is also contemplated that the data can be written to SLC in parallel with writing to QLC. One of the copies of the data, typically the data written in SLC but could be the data written in QLC, will be a temporary copy that can be used to protect the data written in the other location. It is also contemplated that rather than writing to SLC, the data can be written other locations instead such as MLC or even QLC. In any of the scenarios, one set of data is temporary and maintained until the data is written in both locations and validated in the permanent location. Once the data is valid in the permanent location, the temporary data can be discarded.

To protect the data and potentially recover data from potential bit flips, parity data may be created for the incoming zone data that is multiplexed into SLC. As shown in FIG. 2, parity data can be included in a die such as Die 31. The temporary copy of data in SLC can be written across multiple planes/dies and also be protected by parity data. The parity data can be used in situations where data is first written to SLC and then errors are encountered, the errors can be corrected. More specifically, if errors occur, the data is recovered using the parity data. Once there are no errors, the data can be copied to QLC. If there are errors on copying to QLC, then the copy stored in SLC can be used to recover the data. In one embodiment, the parity data is exclusive or (XOR) parity data. The parity data may be stored in SLC along with the incoming zone data that is multiplexed. In one embodiment, the parity data may be stored in a separate location from the SLC. In the embodiment shown in FIG. 2, it can be seen that the zone data is disposed in 31 dies, and a separate die is dedicated to the parity data. In one embodiment, the parity data is not written to QLC. In another embodiment, the parity data is written to QLC.

For small zone ZNS, staging all zone data in SLC can utilize a significant amount of SLC memory. For example, for 256 open-zones per 1 TB, the SLC cache has to be sized based on the number of active zones for the drive plus some additional SLC capacity (OP). The reason for the sizing and OP is because likely there will be some amount of SLC garbage collection (GC) occurring. Even with each zone being a single NAND QLC erase block, the number of blocks in the SLC cache for 32 TB and 64 TB ZNS drive means the SLC cache size becomes huge.

One manner to reduce the huge SLC cache is to use zone write groups (ZWGs) to assist data storage devices and host devices with data recovery. The ZNS would include host zones and parity zones. The data storage device controller receives an indication of corrupted data associated with the ZNS and requests one or more buffers stored in the ZWG and performs the data recovery with the one or more buffers. Such a scenario involves releasing the ZWGs data and parity blocks only after all participating zones are being released by the host. More specifically, the parity blocks usage is only temporary for the time the data is programmed, and later on the parity blocks are released and the data is no longer protected. The scenario might be a significant disadvantage, as the host may release the zones independently, but won't be able to utilize the reclaimed space until the last zone is released.

One proposal for reducing the SLC cache size is to keep in SLC only the last few WLs that are programmed to each zone, which should allow recovering failures that are limited to the last few WLs, but doesn't allow recovery of block level failure. In many NAND generations, block level failures alone may hit UBER of $1e^{-12}$, which is too high and doesn't meet the $1e^{-14}$ requirements. Thus, due to the high UBER the additional SLC caching of the entire zone is not needed as even with the SLC caching block level failures would still be an issue. Caching only the last few word lines, including the last word line, will save a significant amount of SLC cache so that the SLC cache size can be reduced.

As discussed herein, the data can be protected using a dual approach. The first prong of the dual approach is to use temporary parity for data written as zone groups which eliminates and/or reduces SLC cache size. As noted above, zone groups are multiple zones written concurrently to achieve a specific minimum write performance, for example 100 MB/s. Zone groups can be used in a system that allows direct write to the QLC block (like MLC/FN programming scheme), or in a system that requires staging data through SLC (like in a FG/FN programming scheme). However with the first prong approach, block level failures could be recovered even if keeping only limited part of the zone in SLC area as required for FG/FN staging.

The second prong of the dual approach is to stage through SLC cache the entire zone data for independent zones. An independent zone could be written if there was no minimum performance requirement (i.e., writing a single NAND erase block would only provide 6-7 MB/s for example) and the application does not desire to write a zone group amount of data at once. The assumption is that the number of independent open zones that are needed is significantly below the total number of open-zones, and thus the SLC cache size is reduced proportionally to the number.

Keeping the parity (e.g., XOR parity) within a parity stripe (i.e., jumbo-block) until all the data is invalidated and released will not work properly with zone groups since zones (i.e., every plane-block) may be released independently in different times which would lead to garbage collection (GC). GC is opposed to ZNS which aims to eliminate GC.

Therefore, for host data written as a zone group, the SSD will create a temporary parity stripe. For example, if there is a zone group that is 15 zones (which would achieve about 100 MB/s write performance), then the SSD would write 1 additional erase block as parity. Stated another way, there would be a 15+1 plane stripe. The parity-block would then be released immediately after an entire zone-group is fully written. Optionally, a data validation, such as enhanced post write read (EPWR) check may occur. In the event of any program failure while the zone group is being filled, the parity-block would be used to recover the lost data even if an entire erase block failed, which provides the required UBER protection (i.e., equivalent to big SLC cache data path).

Figure 3:
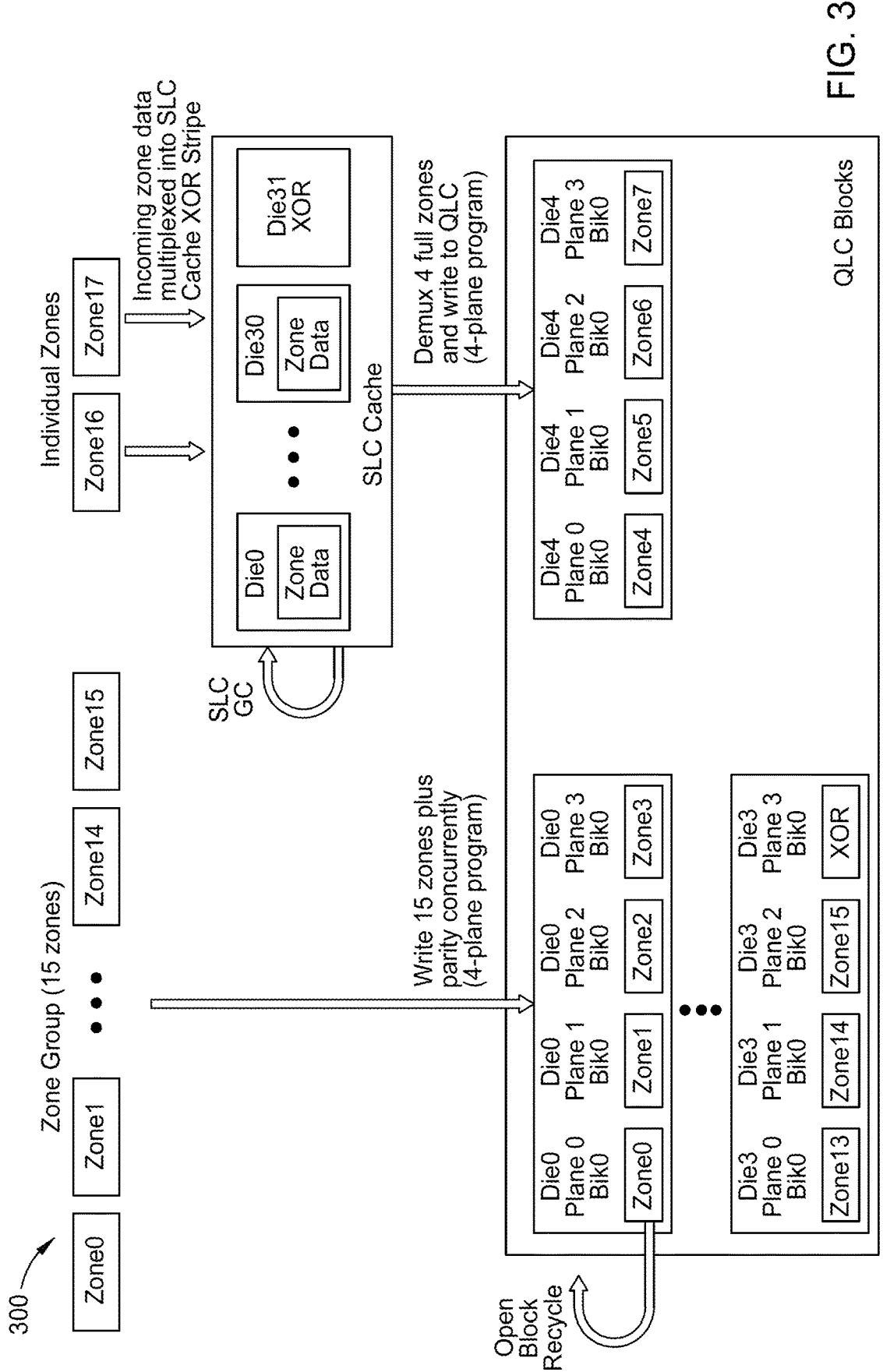
FIG. 3 is a schematic illustration of writing to zones in a ZNS environment according to another embodiment.

FIG. 3 is a schematic illustration 300 of writing to zones in a ZNS environment according to another embodiment. In FIG. 3, zone group data is written directly to QLC blocks and not staged in SLC cache. Individual zones, however, are staged through SLC cache as was performed in the embodiment of FIG. 2. For the individual zones, similar to FIG. 2, it is contemplated that the data can be written to SLC as a temporary copy and then copied to QLC as a permanent copy. Alternatively, it is also contemplated that the data can be written to SLC in parallel with writing to QLC. One of the copies of the data, typically the data written in SLC but could be the data written in QLC, will be the temporary copy that can be used to protect the permanent data written in the other location. It is also contemplated that rather than writing to SLC, the temporary data can be written to a different location such as MLC or even QLC. In any of the scenarios, one set of data is temporary and maintained until the data is written in both locations and validated in the permanent location. Once the data is valid in the permanent location, the temporary data can be discarded.

To protect the data and potentially recover data from potential bit flips, parity data may be created for the incoming zone data that is multiplexed into SLC. The temporary copy of data in SLC can be written across multiple planes/dies and also be protected by parity data. The parity data can be used in situations where data is first written to SLC and then errors are encountered, the errors can be corrected. More specifically, if errors occur, the data is recovered using the parity data. Once there are no errors, the data can be copied to QLC. If there are errors on copying to QLC, then the copy stored in SLC can be used to recover the data. In one embodiment, the parity data is exclusive or (XOR) parity data.

For the zone group, there are 16 small zones exemplified with 15 of the small zones being user data and 1 small zone being parity data. It is to be noted that 16 small zones is merely an example. The number of small zones is not limited to 16. The zone group and parity data is written concurrently to QLC in a 4 plane programming. For the individual zones, the data is staged through SLC cache by multiplexing the data into the SLC cache and a parity location, die 31 in this example. The zones are then demuxed and written to QLC in a 4 plane programming. Note that in the example of FIG. 3, the parity data from the individual zones is not copied to QLC. The parity data can remain in SLC or even be stored in a separate location from SLC and QLC. The zone group can be considered similar to a jumbo block with blocks written in parallel, but the blocks are independent. The parity can be created for such a jumbo block.

The overhead for storing temporary parity for the open zone groups is minimal. For example, on a 64 TB ZNS drive that would have about 16 k open zones, then with 15 zone groups that would be about 1K open zone groups. The parity overhead would therefore be about 1K blocks in a 64 TB drive with 1 M blocks, which is just 0.1% capacity overhead.

While FIG. 3 shows zone groups written directly to QLC where parity data is maintained in QLC in a plane block within the zone group, such an arrangement is not the only option. The parity data does not have to be maintained in QLC, but rather, can be kept in SLC. Furthermore, the parity data for the zone group does not need to be a part of the zone group.

It is to be noted that the data storage device can support both zone groups and individual zones. The controller of the data storage device can inform the host device of a threshold amount of space allocated to zone groups and to individual zones. When the threshold is reached (e.g., threshold for zone groups is reached), then the host device will have to switch to the other (e.g., individual zones) for writing.

Figure 4:
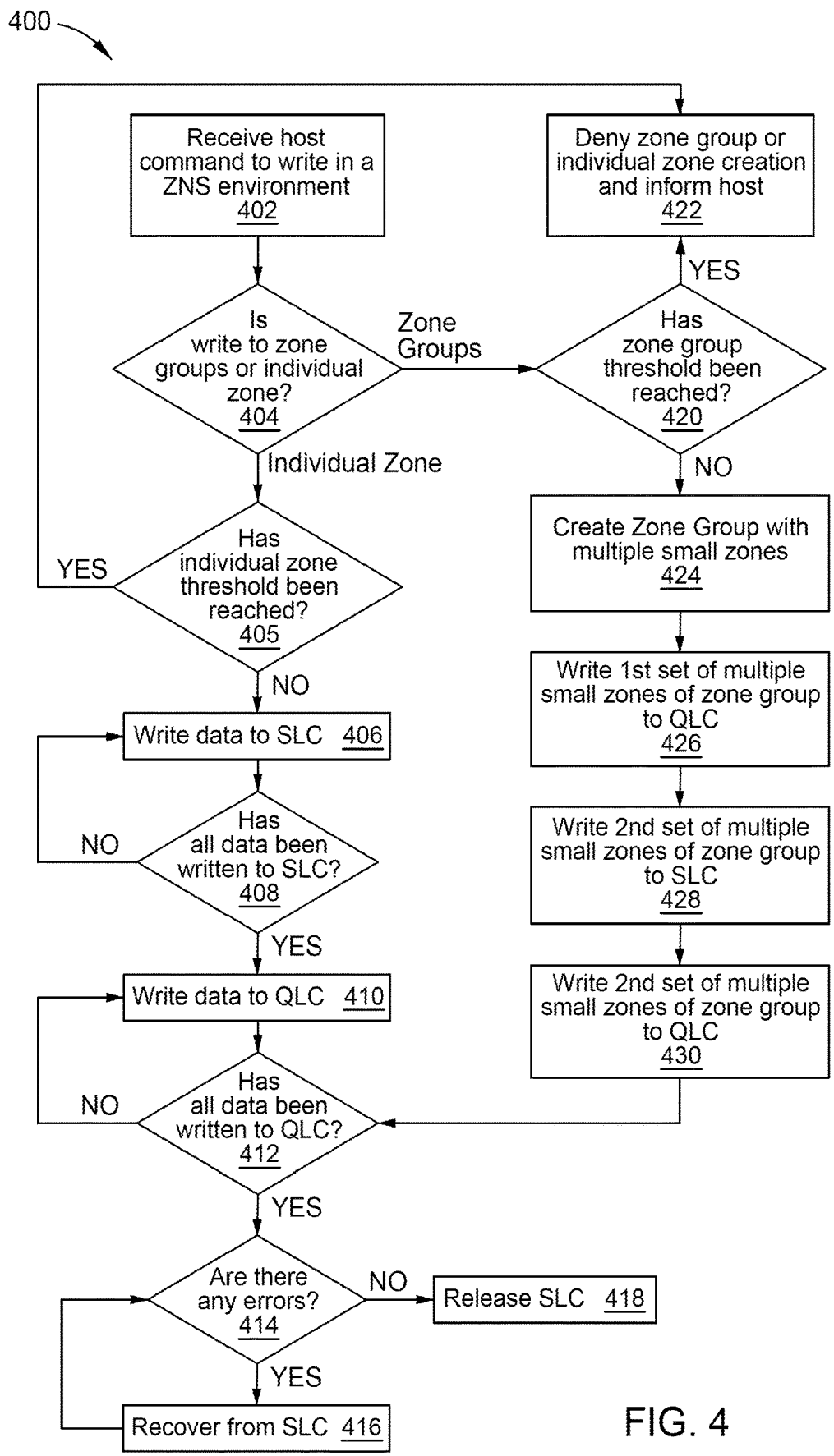
FIG. 4 is a flowchart illustrating a method of writing to zones in a ZNS environment according to one embodiment.

FIG. 4 is a flowchart 400 illustrating a method of writing to zones in a ZNS environment according to one embodiment. The method begins by receiving a host command to write in a ZNS environment at 402. The controller of the data storage device then determines whether the write is to a zone group or to an individual zone at 404. If the write is to an individual zone, then a determination is made regarding whether the individual zone threshold has been reached at 405. If the threshold has been reached, then at 422, the controller denies individual zone creation and informs the host device. If the threshold has not been reached, then at 406 the data is written to SLC cache. Parity data is also created and may be stored in the SLC cache or some other location. A determination is then made regarding whether all data has been written to SLC cache at 408. If there is more data to be written, then the method circles back to 406. If all of the data has been written, then the data is then written to QLC at 412. It is to be noted that the data can be written to SLC and QLC either in parallel of in series. If the data is written in series, then the data is written to SLC first, as shown in FIG. 4, and parity data is created to protect the data written to SLC. Once the data is valid, the data in SLC is then copied to QLC. The SLC data could then be discarded as the SLC data is only temporary in an in series writing. If the data is written to SLC and QLC in parallel, then the parity data may not be included with the SLC data. The point being that in the individual zone scenario, there are two sets of data, a temporary set of data and a permanent set of data. The temporary set of data being the SLC data and the permanent data being the QLC data. A determination is made regarding whether there are any errors at 414. If there are no errors, then the SLC cache can be released at 418. If there are errors, then the data can be recovered from SLC at 416 and then checked again to confirm that there are no errors at 414.

If the write is to a zone group, then a determination is made regarding whether the zone group threshold has been reached at 420. If the threshold has been reached, then the controller denies zone group creation and informs the host device at 422. If the threshold has not been reached, then the zone group is created with multiple small zones at 424. The first set of small zones in written directly to QLC at 426 and followed by writing a second set of small zones to SLC at 428. The second set of small zones is then written to QLC at 430 and the method continues to 412. The first set of small zones comprises user data. The second set of small zones may comprise some user data as well as parity data and/or the last few word lines of the user data. If the last few word lines of the user data is stored in SLC, at the very least, the last word line of the user data is stored in SLC to aid in data recovery.

By utilizing parity data for a zone group, desired UBER is achieved while being able to at least partially recover data. Additionally, writing a majority of user data directly to MLC while writing only a small portion of the user data, specifically at least the last word line of the user data, to SLC decreases SLC cache. The embodiments discussed herein will significantly reduce SLC cache size (and gain cost/margin) because the total number of open zones that require SLC staging is reduced significantly (assuming the majority of host writes are using zone groups).

In one embodiment, a data storage device comprises: a memory device; and a controller coupled to the memory device, wherein the controller is configured to: receive a write command for one or more zones in a zoned namespace (ZNS) environment of the memory device; determine whether write command is to write data to an independent zone or to a small zone of a zone group; generate parity data for user data corresponding to the write command; and store the parity data. The controller is configured to determine that the write command is to write data to the zone group. The controller is configured to determine whether a zone group threshold has been reached. The controller is configured to write a first portion of the user data directly to multilevel cell (MLC) memory. The controller is configured to write a second portion of the user data to single level cell (SLC) memory. The controller is further configured to at least partially recover data to achieve an uncorrectable bit error rate (UBER) that is below a predetermined threshold. The controller is configured to store the parity data in a single level cell (SLC) memory or quad level cell (QLC) memory. The controller is configured to store the parity data in a location separate from the one or more zones. The controller is configured to determine that the write command is to write data to the independent zone. The controller is configured to store all data in a single level cell (SLC) memory and copy the data from SLC memory to multilevel cell (MLC) memory after all data has been written to SLC memory. The controller is configured to provide a zone group threshold value to a host device. The parity data is exclusive or (XOR) parity data.

In another embodiment, a data storage device comprises: a memory device; and a controller coupled to the memory device, wherein the controller is configured to: receive a write command to write user data to a plurality of small zones in a zone group of a zoned namespace (ZNS) environment; write a first portion of the user data to at least one first small zone of the plurality of small zones, wherein the first portion is written in multilevel cell (MLC) memory of the memory device; and write a second portion of the user data to at least one second small zone of the plurality of small zones, wherein the second portion is written in single level cell (SLC) memory of the memory device, wherein the second portion is less than all of the user data. The first portion is not written to the SLC memory. The second portion is copied to the MLC memory. The second portion is erased from SLC memory after being copied to the MLC memory. The second portion includes parity data.

In another embodiment, a data storage device comprises: memory means; and a controller coupled to the memory means, wherein the controller is configured to: receive a write command to write user data to a plurality of small zones in a zone group of a zoned namespace (ZNS) environment of the memory means; allocate a plurality of small zones for the user data; allocate an additional storage location for parity data; write the user data to the plurality of small zones, wherein at least a first small zone of the plurality of small zones is disposed in a single level cell (SLC) of the memory means and at least a second small zone of the plurality of small zones is disposed in a multilevel cell (MLC) of the memory means; and write the parity data in the additional zone. The additional zone is stored in a location separate from the SLC and the MLC. The controller is further configured to demux the user data in the first small zone and write the user data from the first small zone in the MLC.

In another embodiment, a data storage device with a small SLC cache and a dual temporary data protecting approach comprises: a memory device; and a controller coupled to the memory device, wherein the controller is configured to store temporarily the exclusive or (XOR) parity data of a plurality of open zone groups in the memory and to store another temporary copy of independent zones user data without a XOR parity in a small SLC cache or in MLC. The controller is configured to evacuate the independent zone data from the SLC cache memory to multilevel cell (MLC) memory. The controller is further configured to close zone groups when the write commands to the zone groups are completed and to release the zone groups' XOR parities. The controller is further configured to at least partially recover data to achieve an uncorrectable bit error rate (UBER) that is below a predetermined threshold using the zone groups XOR parity while the zone groups are open. The controller is further configured to write the zone group data directly to multilevel cell (MLC) memory. In case of QLC programming using two-stage fogy-fine scheme, the controller is further configured to temporarily stage few rolling WL's of data in SLC cache or volatile memory for the fine programming stage. The controller is configured to store the XOR parity data in a location separate from the plurality of zone groups or within an additional block as part of the zone group. The maximal numbers of open zone groups and independent zones managed by the controller concurrently are predetermined.

In another embodiment, a data storage device comprises: a memory device; and a controller coupled to the memory device, wherein the controller is configured to: open either an independent zone or a zone within a zone group based upon a command received from a host device; and write to either the independent zone or the zone within the zone group. The controller is configured to allowance a first predetermined number of independent zones and a second predetermined number of zone groups. The first predetermined number is less than the second predetermined number. The controller is configured to inform the host device of a size for zone groups. The controller is configured to inform the host device of a number of open zones are supported for zone groups. The controller is configured to inform the host device of a number of open zones are supported for independent zones. The controller is configured to store exclusive or (XOR) parity data of zone groups in the memory device. The controller is configured to store independent zone user data without exclusive or (XOR) parity in a single level cell (SLC) cache. The controller is configured to write to a multilevel cell (MLC) of the memory device.

In another embodiment, a data storage device comprises: means to store data; and a controller coupled to the means to store data, wherein the controller is configured to: allocate a first predetermined amount of the means to store data for independent zones; and allocate a second predetermined amount of the means to store data for zone groups, wherein the second predetermined amount is greater than the first predetermined amount. The controller is further configured to at least partially recover data to achieve an uncorrectable bit error rate (UBER) that is below a predetermined threshold. The controller is configured to store parity data in a location separate from user data.

While the foregoing is directed to embodiments of the present disclosure, other and further embodiments of the disclosure may be devised without departing from the basic scope thereof, and the scope thereof is determined by the claims that follow.

What is claimed is:

1. A data storage device with a small SLC cache and a dual temporary data protecting approach, comprising:
    a memory device; and
    a controller coupled to the memory device, wherein the controller is configured to:
        store temporarily exclusive or (XOR) parity data of a plurality of open zone groups in the memory; and
        store another temporary copy of independent zones user data without a XOR parity in a small SLC cache or in MLC.

2. The data storage device of claim 1, wherein the controller is configured to evacuate independent zone data from the small SLC cache to multilevel cell (MLC) memory.

3. The data storage device of claim 2, wherein the controller is further configured to close zone groups when write commands to the zone groups are completed and to release zone groups' XOR parities.

4. The data storage device of claim 3, wherein the controller is further configured to at least partially recover data to achieve an uncorrectable bit error rate (UBER) that is below a predetermined threshold using zone groups XOR parity while the zone groups are open.

5. The data storage device of claim 3, wherein the controller is further configured to write zone group data directly to multilevel cell (MLC) memory.

6. The data storage device of claim 5, wherein in case of QLC programming using two-stage fogy-fine scheme, the controller is further configured to temporarily stage few rolling WL's of data in SLC cache or volatile memory for the fine programming stage.

7. The data storage device of claim 3, wherein the controller is configured to store XOR parity data in a location separate from the plurality of open zone groups or within an additional block as part of the zone group.

8. The data storage device of claim 3, wherein a maximal number of open zone groups and independent zones managed by the controller concurrently are pre-determined.

9. A data storage device, comprising:
    a memory device; and
    a controller coupled to the memory device, wherein the controller is configured to:
        open either an independent zone or a zone within a zone group based upon a command received from a host device; and
        write to either the independent zone or the zone within the zone group.

10. The data storage device of claim 9, wherein the controller is configured to allowance a first predetermined number of independent zones and a second predetermined number of zone groups.

11. The data storage device of claim 10, wherein the first predetermined number is less than the second predetermined number.

12. The data storage device of claim 9, wherein the controller is configured to inform the host device of a size for zone groups.

13. The data storage device of claim 12, wherein the controller is configured to inform the host device of a number of open zones are supported for zone groups.

14. The data storage device of claim 13, wherein the controller is configured to inform the host device of a number of open zones are supported for independent zones.

15. The data storage device of claim 9, wherein the controller is configured to store exclusive or (XOR) parity data of zone groups in the memory device.

16. The data storage device of claim 9, wherein the controller is configured to store independent zone user data without exclusive or (XOR) parity in a single level cell (SLC) cache.

17. The data storage device of claim 9, wherein the controller is configured to write to a multilevel cell (MLC) of the memory device.

18. A data storage device, comprising:
    means to store data; and
    a controller coupled to the means to store data, wherein the controller is configured to:
        allocate a first predetermined amount of the means to store data for independent zones; and
        allocate a second predetermined amount of the means to store data for zone groups, wherein the second predetermined amount is greater than the first predetermined amount.

19. The data storage device of claim 18, wherein the controller is further configured to at least partially recover data to achieve an uncorrectable bit error rate (UBER) that is below a predetermined threshold.

20. The data storage device of claim 18, wherein the controller is configured to store parity data in a location separate from user data.

* * * * *